United States Patent [19]

Takao et al.

[11] Patent Number: 4,987,199

[45] Date of Patent: Jan. 22, 1991

[54] ETHYLENE-ACRYLIC ACID ESTER COPOLYMER AND PROCESS FOR PRODUCING THE SAME

[75] Inventors: Hiroyoshi Takao, Chiba; Nobuyuki Yoshida; Kiyosi Ikeda, both of Ichihara; Masahiro Fukuyama, Chiba, all of Japan

[73] Assignee: Sumitomo Chemical Company, Limited, Osaka, Japan

[21] Appl. No.: 247,515

[22] Filed: Sep. 22, 1988

[30] Foreign Application Priority Data

Sep. 24, 1987 [JP] Japan ................................. 62-241976

[51] Int. Cl.$^5$ ................................................ C08F 8/00
[52] U.S. Cl. ............................... 525/327.3; 525/327.4; 525/329.6; 525/329.7; 525/387
[58] Field of Search ................. 525/387, 327.3, 327.4, 525/329.6, 329.7

[56] References Cited

FOREIGN PATENT DOCUMENTS 62-14568 2/1987 Japan.
63-30552 2/1988 Japan.

*Primary Examiner*—Bernard Lipman
*Attorney, Agent, or Firm*—Stevens, Davis, Miller & Mosher

[57] ABSTRACT

The present invention provides an ethylene-acrylic acid ester copolymer giving low deformation during vulcanization and having a high dimensional accuracy and excellent properties, as well as a process for producing said copolymer.

16 Claims, No Drawings

ETHYLENE-ACRYLIC ACID ESTER COPOLYMER AND PROCESS FOR PRODUCING THE SAME

The present invention relates to an ethylene-acrylic acid ester copolymer with improved processability, as well as to a process for producing said copolymer.

With the recent technological progresses in various industrial fields such as automobiles, home electric appliances, machines and the like, a number of rubber materials are now used in parts of these products, and the requirements for such rubber materials are diversified. In order to meet these requirements, various elastomers have been and still are being developed. Such elastomers include an amorphous copolymer composed of, for example, ethylene and an acrylic acid ester.

This amorphous copolymer is produced according to known polymerization processes. It can be produced according to, for example, free-radical-initiated bulk polymerization, emulsion polymerization or solution polymerization. A typical process is described in JP-B No. 46-45085 and an amorphous copolymer is obtained, for example, by effecting polymerization under conditions of 500 kgf/cm$^2$ or above (pressure) and 40°–300° C. (temperature) with a polymerization initiator capable of generating a free radical.

The above amorphous copolymer, however, has a low Mooney viscosity at 100° C. as measured according to JIS K 6300; the molded rubber article produced by calendering or extrusion using the amorphous copolymer as a base material causes high deformation; and the vulcanizate obtained by subjecting the molded rubber article to steam vulcanization or hot air vulcanization causes deformation as well. When the amorphous copolymer is injection molded, the resulting molded article contains trapped air.

It is known in the rubber industry that a rubber is vulcanized with a crosslinking agent in order to endow the rubber with a desired strength. Since such vulcanization reduces the processability of the rubber or makes the processing impossible (this contradicts with the aim of the present invention), the vulcanization is ordinarily effected after the rubber has been processed into a desired product shape by calendering or extrusion.

It is also known that in the rubber processing, a rubber is subjected to mechanical shear called "mastication" to plasticize the rubber and to improve its processability. In the case of natural rubber, for example, the mastication is ordinarily conducted at a relatively low temperature of about 60° C. with mixing rolls, or at a high temperature of about 120° C. with a closed kneader.

Thus, it is known that a rubber, when subjected to mechanical shear, causes molecular scission and resultant reduction in molecular weight, whereby the rubber is plasticized and is endowed with improved processability.

The mastication, however, has a problem of reducing the inherent properties of rubber because the mastication causes molecular scission and resultant reduction in molecular weight. All these problems are considered to be attributable to the low Mooney viscosity of the amorphous copolymer composed, for example, of ethylene and an acrylic acid ester.

The object of the present invention is to provide an ethylene-acrylic acid ester copolymer which has alleviated the above-mentioned problems of the amorphous copolymer composed of, for example, ethylene and an acrylic acid ester and which has a high strength and a high dimensional accuracy, as well as a process for producing the copolymer.

The present inventors made an extensive study on the alleviation of the above problems of the amorphous copolymer composed of, for example, ethylene and an acrylic acid ester. As a result, the present invention has been completed.

The present invention relates to an ethylene-acrylic acid ester copolymer containing a boiling xylene insoluble in an amount of 5–90% by weight, which is obtained by copolymerizing:
(A) 50–85 mole % of ethylene,
(B) 50–15 mole % of an acrylic acid ester, and
(C) up to 8 parts by weight, based on 100 parts by weight of the components (A) and (B), of a crosslinkable third component.

The present invention also relates to a process for producing an ethylene-acrylic acid ester copolymer containing a boiling xylene insoluble in an amount of 5–90% by weight which process comprises copolymerizing:
(A) 50–85 mole % of ethylene,
(B) 50–15 mole % of an acrylic acid ester, and
(C) up to 8 parts by weight, based on 100 parts by weight of the components (A) and (B), of a crosslinkable third component
to obtain an amorphous copolymer and then subjecting the amorphous copolymer to partial crosslinking with a crosslinking agent at a high temperature of 80° C. or above while applying a shear force.

In the present invention, the acrylic acid ester (B) which is a constituent of the amorphous copolymer is an ester of acrylic acid and an alcohol of 1–8 carbon atoms. Specific examples of the acrylic acid ester (B) are methyl acrylate, ethyl acrylate, n-butyl acrylate, t-butyl acrylate and 2-ethylhexyl acrylate. They can be used alone or as an admixture of two or more.

The molar ratio of ethylene (A) and the acrylic acid ester (B) is 50–85:50–15, preferably 60–85:40–15, more preferably 62–81:38–19.

When the content of the acrylic acid ester (A) exceeds 50%, the resulting copolymer has a higher embrittlement temperature, making difficult its use as an elastomer at low temperatures. When the content is lower than 15%, the copolymer has a higher crystallinity and accordingly has no sufficient elasticity as an elastomer.

In the present invention, the crosslinkable third component (C) which is a constituent of the amorphous copolymer includes, for example, an unsaturated compound having an unsaturated glycidyl ester group, an acid anhydride group, a carboxylic acid group or the like.

As the unsaturated compound having an unsaturated glycidyl ester group, there can be mentioned, for example, those described in JP-B-46-45085, such as glycidyl acrylate, glycidyl methacrylate, diglycidyl itaconate, triglycidyl butenetricarboxylate, glycidyl p-styrenecarboxylate and the like. As the unsaturated compound having a carboxylic acid group, there can be mentioned, for example, acrylic acid, methacrylic acid, maleic acid, an half ester of maleic acid, a monoalkyl ester of 1,4-butenedionic acid and the like. As the unsaturated compound having an acid anhydride group, there can be mentioned, for example, maleic anhydride and the like.

The third component (C) is used in an amount of up to 8 parts by weight, preferably 0.1–7 parts by weight, more preferably 1–6 parts by weight, most preferably 2–5.5 parts by weight based on 100 parts by weight of the components (A) and (B). When no third component is present in the amorphous copolymer, the crosslinking of the amorphous copolymer is effected mainly with an organic peroxide. When the third component is present in the amorphous copolymer, there may also occur a crosslinking reaction in which the third component acts as a crosslinking site. When the amount of the third component in the amorphous copolymer exceeds 8 parts by weight, the ethylene-acrylic acid ester copolymer produced from the amorphous copolymer has poor scorching resistance when processed into a rubber product, thus making it impossible to obtain good processability.

In the present invention, the ethylene-acrylic acid ester copolymer contains a boiling xylene insoluble in an amount of 5–90% by weight. Such an ethylene-acrylic acid ester copolymer can be obtained by, for example, subjecting the above amorphous copolymer to partial crosslinking with a crosslinking agent.

That is, the ethylene-acrylic acid ester copolymer can be easily obtained by kneading the amorphous copolymer containing substantially no boiling xylene insoluble with an organic peroxide or a crosslinking agent (e.g. a compound capable of reacting with the third component) by means of, for example, a closed kneader (e.g. Banbury mixer, extruder). It can also be obtained continuously by adding a crosslinking agent into the polymerization reaction step.

In the present invention, the ethylene-acrylic acid ester copolymer can be obtained preferably by subjecting the amorphous copolymer to partial crosslinking with a crosslinking agent at a high temperature of 80° C. or above, preferably 95° C. or above while applying a shear force.

The crosslinking agent used in the present invention is preferably an organic peroxide. Specific examples of the organic peroxides are benzoyl peroxide, 2,4-dichlorobenzoyl peroxide, 1,1-di(t-butylperoxy)-3,3,5-trimethylcyclohexane, n-butyl 4,4-bis(t-butylperoxy)-valerate, dicumyl peroxide, di-t-butylperoxy-diisopropylbenzene, 2,5-dimethyl-2,5-di(t-butylperoxy)hexane and 2,5-dimethyl-2,5-di(t-butylperoxy)hexyne-3.

These crosslinking agents can be used alone or as an admixture of two or more. They may be used together with an activating agent ordinarily used, such as sulfur, a sulfur compound (e.g. dipentamethylene-thiuram disulfide), a polyfunctional monomer (e.g. ethylene dimethacrylate, divinylbenzene, m-phenylene bismaleimide) or an oxime compound (e.g. quinone dioxime, benzoylquinone dioxime).

A crosslinking agent and its amount suitable for the partial crosslinking of the amorphous copolymer are selected in view of the temperature, time and apparatus used for the crosslinking.

Incidentally, more detailed description on crosslinking agents is made in "Handbook on Crosslinking Agents" [published from K. K. Taisei, Tokyo (1987)].

The amount of crosslinking agent used is preferably 0.1–5 parts by weight, more preferably 0.2–3 parts by weight based on 100 parts by weight of the amorphous copolymer.

When the amount of crosslinking agent used is less than 0.1 part by weight, it is impossible to obtain partial crosslinking sufficient to provide improved processability. When the amount is more than 5 parts by weight, it is difficult to control the partial crosslinking.

The partial crosslinking and the application of a shear force at a temperature of 80° C. or above can be effected in numerous combinations. For example, an amorphous copolymer and a crosslinking agent can be mixed using an apparatus such as Banbury mixer, extruder or the like, and concurrently therewith there can be effected the crosslinking of the amorphous copolymer by heat and the application of a shear force.

When it is necessary to stop the crosslinking reaction, 0.5–8 parts by weight, based on 100 parts by weight of the amorphous copolymer obtained above, of an antioxidant can be added to the copolymer, whereby the further occurrence of the partial crosslinking reaction of the copolymer can be prevented. As the antioxidant, there can be used phenol type antioxidants such as 2,6-di-t-butyl-4-methylphenol, 2,2'-methylene-bis(-4-methyl-6-t-butylphenol) and the like, as well as amine type antioxidants such as bis(2'-phenyl-4-isopropylphenyl)amine, N-phenyl-N'-isopropyl-p-phenylenediamine and the like.

When the ethylene-acrylic acid ester copolymer of the present invention is stored for a while before use, it is preferred that the copolymer is subjected, prior to the storage, to the above procedure for preventing the further occurrence of crosslinking reaction.

In the present invention, "partial crosslinking" refers to such crosslinking as reprocessing thereafter is possible. Therefore, the partially crosslinked copolymer according to the present invention is different from ordinary vulcanized rubbers whose reprocessing is substantially impossible.

In the present invention, "boiling xylene insoluble" refers to an insoluble obtained when an ethylene-acrylic acid ester copolymer has been dissolved in boiling xylene under reflux for 6 hours.

The ethylene-acrylic acid ester copolymer of the present invention contains a boiling xylene insoluble in an amount of preferably 5–90% by weight, more preferably 20–65% by weight. When the amount is less than 5% by weight, the copolymer has no sufficient effects in deformation, etc. When the amount is more than 90% by weight, the copolymer possesses deteriorated properties after vulcanization.

The thus obtained ethylene-acrylic acid ester copolymer with improved processability can incorporate various compounding ingredients known in the rubber industry, such as filler, anti-aging agent, plasticizer and the like. Having excellent processability, the resulting compound can be used as rubber hoses, diaphragms, belts, rolls and sealing materials.

The present invention is specifically illustrated below by way of Examples. However, the present invention is in no way restricted to these Examples.

The amorphous copolymers shown in Table 1 were kneaded with an organic peroxide under the conditions shown in Table 2 at a rotor r.p.m. of 60 with a closed kneader (a 1.5-liter Banbury mixer), whereby ethylene-acrylic acid ester copolymers containing a boiling xylene insoluble were produced.

The boiling xylene insoluble was measured according to the follow method.

1 g of a cube-shaped sample (about 1 mm$^3$) obtained by cutting was weighed accurately and introduced in 150 ml of xylene in a 300-ml flask. The flask was heated and the sample was dissolved in boiling xylene under reflux for 6 hours. The flask was cooled to room temperature and then shaken at a rate of 150 times/min for 1 hour.

The resulting solution was filtered through a 120-mesh wire net which had been weighed accurately.

The wire net on which the boiling xylene insoluble of the sample remained was dried at 90° C. for 30 minutes and then reweighed accurately, whereby the weight of the boiling xylene insoluble remaining on the wire net was obtained. The boiling xylene insoluble in the sample was determined by calculating the following formula.

Boiling xylene insoluble (wt. %) =

[Sample (g) remaining on wire net] ÷ [Original sample (g)] × 100

The ethylene-acrylic acid ester copolymers shown in Table 1 and Table 2 were kneaded with the compounding ingredients shown in Table 3 in accordance with the compounding recipes shown in Table 3, with an 8-inch open roll mill to obtain various compounds. The compounds were measured for extrudability and properties, and their vulcanizates were subjected to tensile test. The results are shown in Table 3.

The extrudability was measured by subjecting each compound to extrusion from a 12-mmφ tube die of a 45-mmφ rubber extruder.

The shape retention of molded article (extruded tube) which is a meritorious effect of the present invention was measured as follows.

The shape retention of an unvulcanized extruded tube was measured after allowing the tube to stand for 1 day after molding (extrusion), and the shape retention of a steam-vulcanized extruded tube was measured after subjecting the extruded tube to vulcanization at 160° C. for 40 minutes in steam. The shape retention of an extruded tube before or after steam vulcanization was expressed as a ratio of the minimum inside diameter H of the deformed tube to the maximum inside diameter W of the same tube.

Shape retention (%) = (H/W) × 100

The properties of each compound were measured according to JIS K 6300.

The tensile test was conducted by vulcanizing each compound with a vulcanizing press at 170° C. for 20 minutes to obtain a vulcanized sheet and then measuring the sheet according to JIS K 6301.

As is clear from Table 3, the ethylene-acrylic acid ester copolymer containing a boiling xylene insoluble according to the present invention can provide a product giving low deformation after extrusion and greatly reduced deformation during vulcanization.

It is also clear that the vulcanizate of the ethylene-acrylic acid ester copolymer of the present invention possesses an improved tensile strength.

According to the present invention, there can be provided an ethylene-acrylic acid ester copolymer giving low deformation during vulcanization, a high dimensional accuracy and excellent properties, as well as a process for producing such a copolymer.

TABLE 1

| Amorphous copolymer | Ethylene content (mole %) | Methyl acrylate content (mole %) | Glycidyl methacrylate content (wt. %) | Content of monoethyl ester of 1,4-butenedionic acid (wt. %) | Mooney viscosity of raw rubber ($ML_{1+4}$ 100° C.) | Boiling xylene insoluble (wt. %) |
|---|---|---|---|---|---|---|
| A | 62 | 38 | 2.0 | — | 14 | 0.08 |
| B | 64 | 36 | 2.0 | — | 18 | 0.05 |
| C | 68 | 32 | 2.5 | — | 14 | 0.06 |
| D | 73 | 27 | — | — | 22 | 0.08 |
| E | 77 | 23 | — | 5.5 | 18 | 0.12 |
| F | 81 | 19 | — | 5.5 | 24 | 0.50 |

TABLE 2

| Ethylene-acrylic acid ester copolymer | Amorphous copolymer used | Starting temperature of mixer (°C.) | Amount of organic peroxide* added (phr) | Kneading time (sec) | Temperature at the time of discharge (°C.) | Boiling xylene content (wt. %) |
|---|---|---|---|---|---|---|
| A-1 | A | 95 | 2 | 200 | 125 | 28.3 |
| B-1 | B | 95 | 2 | 300 | 145 | 60.4 |
| C-1 | C | 95 | 2 | 300 | 140 | 45.1 |
| D-1 | D | 95 | 2 | 780 | 135 | 20.0 |
| E-1 | E | 95 | 2 | 1200 | 135 | 25.0 |
| F-1 | F | 95 | 2 | 1200 | 137 | 29.7 |

*1,1-Di(t-butylperoxy)-3,3,5-trimethylcyclohexane (Perhexa ® 3M produced by NIPPON OIL & FATS CO., LTD.)

TABLE 3

| | Comparative Examples | | | | | Examples | | | | | |
|---|---|---|---|---|---|---|---|---|---|---|---|
| | 1 | 2 | 3 | 4 | 5 | 1 | 2 | 3 | 4 | 5 | 6 |
| Copolymer used | A | B | C | D | E | A-1 | B-1 | C-1 | D-1 | E-1 | F-1 |
| Compounding recipe (parts by weight) | | | | | | | | | | | |
| Copolymer | 100 | 100 | 100 | 100 | 100 | 100 | 100 | 100 | 100 | 100 | 100 |
| FEF carbon black | 40 | 80 | 80 | 40 | 40 | 40 | 80 | 80 | 40 | 40 | 40 |
| Plasticizer*1 | — | 20 | 20 | — | — | — | 20 | 20 | — | — | — |
| Stearic acid | 1 | — | — | 1 | 1 | 1 | — | — | 1 | 1 | 1 |
| Stearylamine | 0.3 | 0.5 | 0.5 | 0.3 | 0.3 | 0.3 | 0.5 | 0.5 | 0.3 | 0.3 | 0.3 |
| Naguard ® 445*2 | 2 | 2 | 2 | 1 | 2 | 2 | 2 | 2 | 1 | 2 | 2 |

TABLE 3-continued

| | Comparative Examples | | | | | Examples | | | | | |
|---|---|---|---|---|---|---|---|---|---|---|---|
| | 1 | 2 | 3 | 4 | 5 | 1 | 2 | 3 | 4 | 5 | 6 |
| Isocyanuric acid | 0.76 | 0.8 | 0.8 | — | — | 0.76 | 0.8 | 0.8 | — | — | — |
| Cetyl trimethylammonium bromide | 1.5 | 0.5 | 0.5 | — | — | 1.5 | 0.5 | 0.5 | — | — | — |
| Diphenyl urea | 2.3 | 2.3 | 2.3 | — | — | 2.3 | 2.3 | 2.3 | — | — | — |
| Eicosanedionic acid | 0.5 | — | — | — | — | 0.5 | — | — | — | — | — |
| 4,4'-Diaminodiphenylmethane | — | — | — | — | 1.25 | — | — | — | — | 1.25 | 1.25 |
| Diphenylguanidine | — | — | — | — | 4.0 | — | — | — | — | 4.0 | 4.0 |
| Dicumyl peroxide | — | — | — | 2.5 | — | — | — | — | 2.5 | — | — |
| Benzoyl-p-quinone dioxime | — | — | — | 1.0 | — | — | — | — | 1.0 | — | — |
| Properties | | | | | | | | | | | |
| Mooney viscosity of raw rubber (ML$_{1+4}$ 100° C.) | 14 | 18 | 14 | 22 | 18 | 53 | 85 | 72 | 40 | 46 | 52 |
| Mooney viscosity of compound (ML$_{1+4}$ 100° C.) | 26 | 36 | 32 | 39 | 34 | 47 | 63 | 62 | 69 | 74 | 80 |
| Extrudability and skin | Good | Good | Good | Good | Good | Good | Good | Good | Good | Good | Good |
| Shape retention of unvulcanized tube (%) | 85 | 80 | 81 | 84 | 83 | 98 | 99 | 99 | 99 | 99 | 99 |
| Shape retention of steam vulcanized tube (%) | 15 | 14 | 18 | 25 | 0 | 72 | 80 | 81 | 83 | 60 | 65 |
| Properties of vulcanized sheet obtained by press vulcanization (170° C. × 20 min.) | | | | | | | | | | | |
| T$_B$ (kgf/cm$^2$) | 142 | 136 | 150 | 173 | 155 | 184 | 157 | 151 | 185 | 186 | 171 |
| E$_B$ (%) | 500 | 220 | 190 | 320 | 490 | 370 | 210 | 170 | 270 | 400 | 450 |
| H$_S$ (JIS-A) | 60 | 76 | 79 | 64 | 62 | 62 | 78 | 78 | 61 | 64 | 64 |

*[1] Diacizer D-409 produced by Mitsubishi Kasei Vinyl Co.
*[2] Antioxidant produced by Uniroyal Chemical Co. of U.S.A.

What is claimed is:

1. An ethylene-acrylic acid ester copolymer containing a boiling xylene insoluble in an amount of 5–90% by weight, which is obtained by copolymerizing:
   (A) 50–80 mole % of ethylene,
   (B) 50–15 mole % of an acrylic acid ester, and
   (C) 0.1–7 parts by weight, based on 100 parts by weight of the components (A) and (B), of a crosslinkable third component which is at least one member selected from the group consisting of glycidyl acrylate, glycidyl methacrylate, diglycidyl itaconate, triglycidyl butenetricarboxylate, glycidyl p-styrenecarboxylate, acrylic acid, methacrylic acid, maleic acid, a half ester of maleic acid, a monoalkyl ester of 1,4-butenedionic acid and maleic anhydride to obtain an amorphous copolymer and then subjecting the amorphous copolymer to partial crosslinking with a crosslinking agent at a high temperature of 80° C. or above while applying a shearing force.

2. An ethylene-acrylic acid ester copolymer according to claim 1, wherein the acrylic acid ester is an ester of acrylic acid and an alcohol of 1–8 carbon atoms.

3. An ethylene-acrylic acid ester copolymer according to claim 1, wherein the acrylic acid ester is at least one member selected from the group consisting of methyl acrylate, ethyl acrylate, n-butyl acrylate, t-butyl acrylate and 2-ethylhexyl acrylate.

4. An ethylene-acrylic acid ester copolymer according to claim 1, wherein the acrylic acid ester is methyl acrylate.

5. An ethylene-acrylic acid ester copolymer according to any of claims 1 to 4, wherein the proportions of the ethylene and the acrylic acid ester is 60–85 mole % and 40–15 mole %, respectively.

6. An ethylene-acrylic acid ester copolymer according to claim 1, wherein the crosslinkable third component (C) is glycidyl methacrylate and/or a monoalkyl ester of 1,4-butenedionic acid.

7. An ethylene-acrylic acid ester copolymer according to claim 1, wherein the proportion of the crosslinkable third component is 1–6 parts by weight based on 100 parts by weight of the components (A) and (B).

8. An ethylene-acrylic acid ester copolymer according to claim 1, wherein the proportion of the crosslinkable third component is 2–5.5 parts by weight based on 100 parts by weight of the components (A) and (B).

9. An ethylene-acrylic acid ester copolymer according to claim 1, containing the boiling xylene insoluble in an amount of 20–65% by weight.

10. A process for producing an ethylene-acrylic acid ester copolymer according to claim 1, which process comprises copolymerizing:
    (A) 50–85 mole % of ethylene,
    (B) 50–50 mole % of an acylic acid ester, and
    (C) 0.1–7 parts by weight, based on 100 parts by weight of the components (A) and (B), of a crosslinkable third component which is at least one member selected from the group consisting of glycidyl acrylate, glycidyl methacrylate, diglycidyl itaconate, triglycidyl butenetricarboxylate, glycidyl p-styrenecarboxylate, acrylic acid, methacrylic acid, maleic acid, a half ester of maleic acid, a monoalkyl ester of 1,4-butenedionic acid and maleic anhydride to obtain an amorphous copolymer and then subjecting the amorphous copolymer to partial crosslinking with a crosslinking agent at a high temperature of 80° C. or above while applying a shearing force.

11. A process according to claim 10, wherein the partial crosslinking of the amorphous copolymer is effected at a high temperature of 95° C. or above.

12. A process according to claim 10, wherein the shear force is applied by kneading.

13. A process according to claim 10, wherein the shear force is applied by kneading with an open roll mill.

14. A process according to claim 10, wherein the crosslinking agent is at least one member selected from the group consisting of benzoyl peroxide, 2,4-dichlorobenzoyl peroxide, 1,1-di(t-butylperoxy)-3,3,5-trimethylcyclohexane, n-butyl 4,4-bis(t-butylperoxy)valerate, dicumyl peroxide, di-t-butylperoxy-diisopropylbenzene, 2,5-dimethyl-2,5-di(t-butylperoxy)hexane and 2,5-dimethyl-2,5-di(t-butylperoxy)hexyne-3.

15. A process according to claim 10, wherein the crosslinking agent is 1,1-di(t-butylperoxy)-3,3,5-trimethylcyclohexane.

16. An ethylene-acrylic acid ester copolymer according to claim 1, wherein the acrylic acid ester is methyl acrylate and the crosslinkable third component is glycidyl methacrylate.

* * * * *